UNITED STATES PATENT OFFICE.

JOHN CARTER BEST, OF MEDICINE LODGE, KANSAS, ASSIGNOR TO THE BEST BROTHERS KEENE'S CEMENT COMPANY, OF MEDICINE LODGE, KANSAS, A CORPORATION OF KANSAS.

MANUFACTURE OF KEENE'S CEMENT.

1,304,148.  Specification of Letters Patent.  Patented May 20, 1919.

No Drawing.   Application filed May 6, 1918.  Serial No. 232,714.

*To all whom it may concern:*

Be it known that I, JOHN CARTER BEST, a citizen of the United States, residing at Medicine Lodge, in the county of Barber and State of Kansas, have invented a new and useful Improvement in the Manufacture of Keene's Cement, of which the following is a specification.

My invention relates to the manufacture of a particular variety of Keene's cement in accordance with the method set forth in the following specification:

The market product known as the superfine grade of Keene's cement and generally used for the manufacture of artificial marble or scagliola has heretofore been produced in the following manner:

A standard grade of Keene's cement is mixed with water, permitted to set, being at that time molded into blocks of suitable size, these blocks are then re-calcined substantially as was the original gypsum. After this second calcination the blocks are crushed and ground to produce the superfine product.

I have discovered that this same product may be more simply and cheaply prepared by initially burning the gypsum at a temperature higher than would ordinarily be employed for the production of a standard grade of Keene's cement. I prefer to carry out this burning or calcining operation in a rotary internally-fired kiln of the type used in the Portland cement industries, conducting the process so as to obtain a temperature of 1200 to 1400° F. of the burnt product issuing from the nose-ring of the kiln. The time of passage of the material through the kiln under these temperature conditions should be approximately one hour.

As as accelerator, catalyst or setting agent for this material I employ a neutral salt, such as neutral potassium sulfate, in the proportion of one per cent. by weight. The entire product should be ground to 150 mesh.

This product prepared in this manner is very slow setting, has no effect upon colors, takes a very high polish, and is perfectly suited for the uses to which the superfine grade of Keene's cement is put, that is particularly for artificial marble or scagliola.

What I claim is:

1. The process of producing a superfine grade of Keene's cement which consists in burning gypsum at a temperature reaching at least 1200° F., admixing with the burnt product a neutral catalyst, and grinding to substantially 150 mesh.

2. The method of producing a superfine grade of Keene's cement which consists in burning gypsum in a rotary internally-fired kiln for a period of substantially one hour at a temperature of 1200 to 1400° F., admixing with the burnt product one per cent. of neutral potassium sulfate, and grinding to 150 mesh.

JOHN CARTER BEST.